United States Patent
Goff

(10) Patent No.: US 7,268,518 B1
(45) Date of Patent: Sep. 11, 2007

(54) BATTERY CHARGER AND EMERGENCY POWER SUPPLY ASSEMBLY

(76) Inventor: Michael H. Goff, 916 Beach Park Blvd. #67, Foster City, CA (US) 94404

( * ) Notice: Subject to any disclaimer, the term of this patent is extended or adjusted under 35 U.S.C. 154(b) by 505 days.

(21) Appl. No.: 10/734,633

(22) Filed: Dec. 15, 2003

(51) Int. Cl.
*H02J 7/00* (2006.01)

(52) U.S. Cl. ..................................... 320/107

(58) Field of Classification Search .............. 320/107, 320/106, 110, 103, 114, 138; 315/86; 174/54; D13/107, 110
See application file for complete search history.

(56) References Cited

U.S. PATENT DOCUMENTS

| | | | | |
|---|---|---|---|---|
| 3,601,679 A | * | 8/1971 | Braun et al. | 320/114 |
| 3,739,226 A | * | 6/1973 | Seiter et al. | 315/86 |
| 3,943,423 A | * | 3/1976 | Hoffman | 320/138 |
| 4,065,710 A | * | 12/1977 | Zytka | 320/103 |
| 4,409,536 A | * | 10/1983 | Evjen | 320/110 |
| 5,412,529 A | | 5/1995 | Eaton et al. | 361/90 |
| 5,627,720 A | | 5/1997 | Lewis | 361/118 |
| 5,701,244 A | | 12/1997 | Emmert et al. | 363/146 |
| 5,809,311 A | | 9/1998 | Jones | 713/300 |
| 6,018,227 A | * | 1/2000 | Kumar et al. | 320/106 |
| 6,121,695 A | | 9/2000 | Loh | 307/64 |
| 6,486,789 B2 | | 11/2002 | Germagian et al. | 340/693.5 |
| 6,548,986 B1 | | 4/2003 | Jakubowski | 320/111 |

* cited by examiner

*Primary Examiner*—Pia Tibbits

(57) ABSTRACT

A battery charger and emergency power supply assembly includes a housing. A switch is positioned in the housing and electrically coupled to a power supply. At least one electrical plug outlet is mounted in the housing and electrically coupled to the switch. A battery charger is mounted within the housing and is electrically coupled to the power supply. Each of a plurality of charging ports extends into the housing and is electrically coupled to the battery charger. Each of a plurality of rechargeable batteries includes plug members adapted for electrically coupled to the charging ports. An inverter is electrically coupled to each of the charging ports. The inverter is also electrically coupled to the switch. The switch may selectively open a circuit between the plug outlet and the power supply or the plug outlet and the inverter.

2 Claims, 3 Drawing Sheets

BATTERY CHARGER AND EMERGENCY POWER SUPPLY ASSEMBLY

BACKGROUND OF THE INVENTION

1. Field of the Invention

The present invention relates to battery charger devices and more particularly pertains to a new battery charger device for providing a combined battery-recharging device with an emergency power supply device by allowing a user of the device utilize the recharged batteries as a back-up power supply for a conventional power outlet.

2. Description of the Prior Art

The use of battery charger devices and backup power supplies are each known in the prior art. U.S. Pat. No. 6,548,986 describes one such type of backup power supply as does U.S. Pat. No. 5,809,311. Rechargeable batteries are offered by major battery supplies and also provide charging devices which are suitable for those batteries.

While these devices fulfill their respective, particular objectives and requirements, the need remains for a device that combines the usefulness of a conventional plug outlet with a battery charger and a power backup system.

SUMMARY OF THE INVENTION

The present invention meets the needs presented above by including a housing that includes a female power plug outlet which may be electrically coupled to the power supply of a dwelling thereby allowing user of the device to utilize the power plug outlet as a conventional outlet.

Another object of the present invention is to provide a new battery charger device that includes a battery charger apparatus for electrically coupling the battery charger to rechargeable batteries. The rechargeable batteries are electrically coupled to the plug outlet. The recharged batteries may be utilized for electrical power if the power supply of the dwelling fails.

To this end, the present invention generally includes a housing. A switch is positioned in the housing and electrically coupled to a power supply. At least one electrical plug outlet is mounted in the housing and electrically coupled to the switch. A battery charger is mounted within the housing and is electrically coupled to the power supply. Each of a plurality of charging ports extends into the housing and is electrically coupled to the battery charger. Each of a plurality of rechargeable batteries includes plug members adapted for electrically coupled to the charging ports. An inverter is electrically coupled to each of the charging ports. The inverter is also electrically coupled to the switch. The switch may selectively open a circuit between the plug outlet and the power supply or the plug outlet and the inverter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
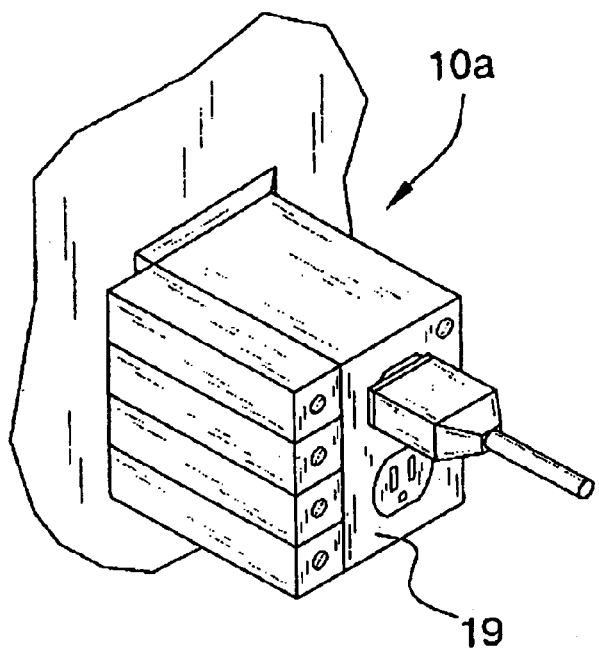
FIG. 1 is a schematic perspective view of a first embodiment of a battery charger and emergency power supply assembly according to the present invention.

With reference now to the drawings, and in particular to FIGS. 1 through 6 thereof, a new battery charger device embodying the principles and concepts of the present invention and generally designated by the reference numeral 10 will be described.

Figure 2:
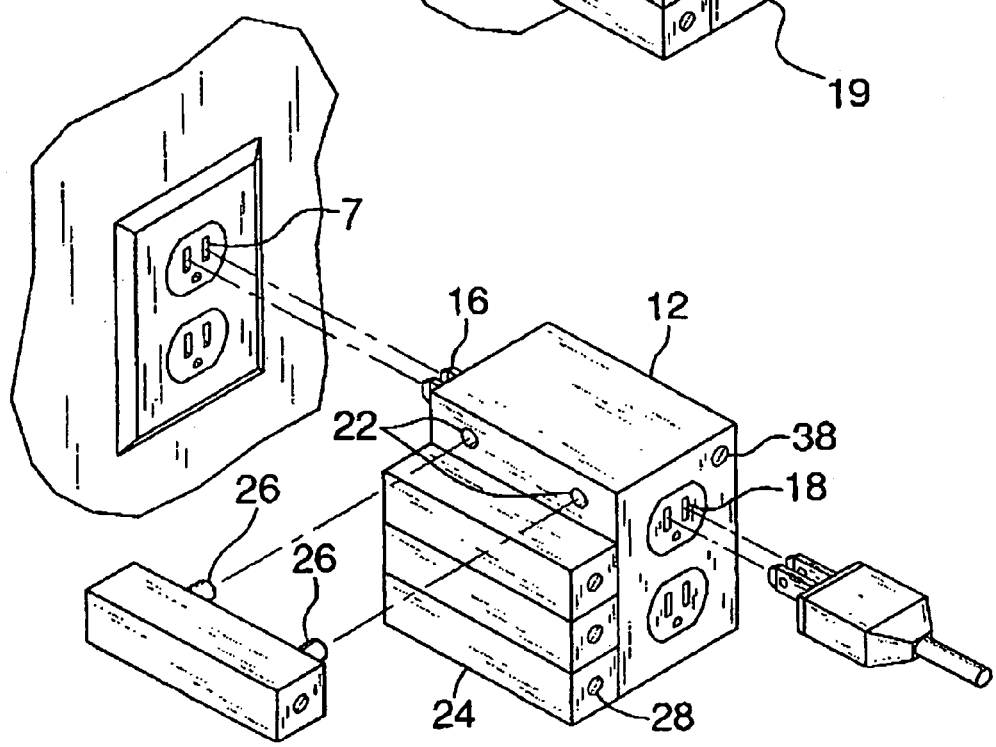
FIG. 2 is a schematic perspective view of the first embodiment of the present invention.
Figure 3:
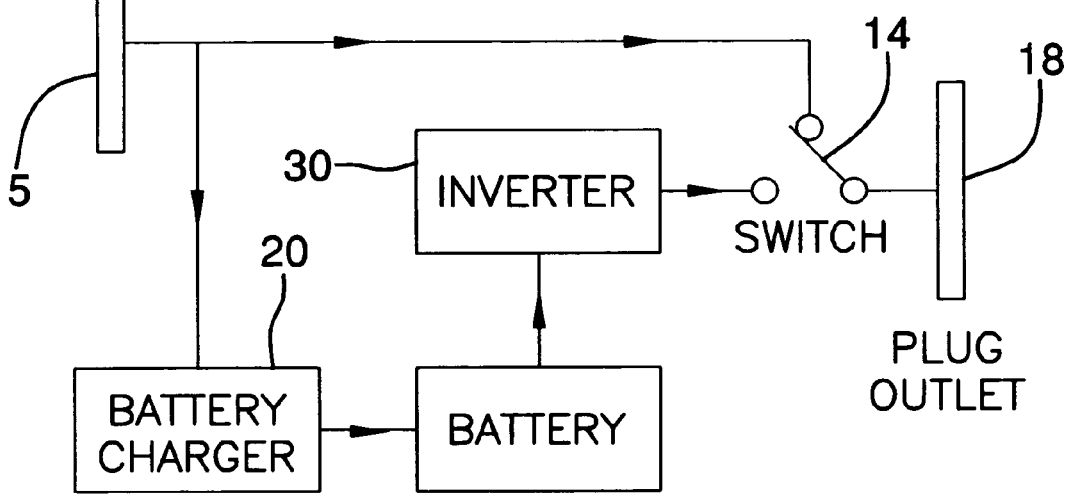
FIG. 3 is an electrical schematic view of the present invention.
Figure 4:
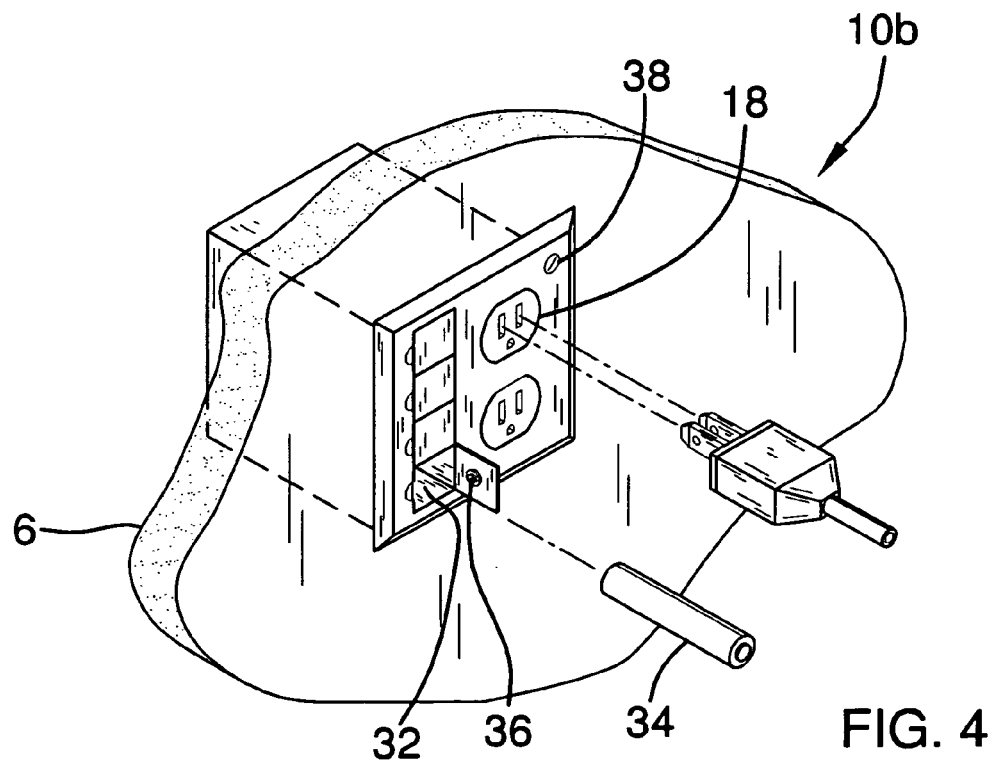
FIG. 4 is a schematic perspective view of a second embodiment of the present invention.
Figure 5:
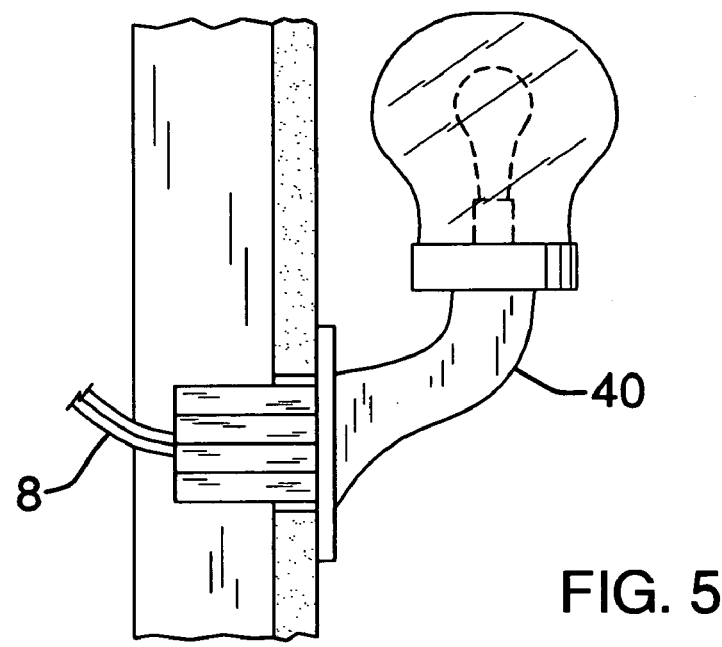
FIG. 5 is a schematic side view of a third embodiment of the present invention.
Figure 6:
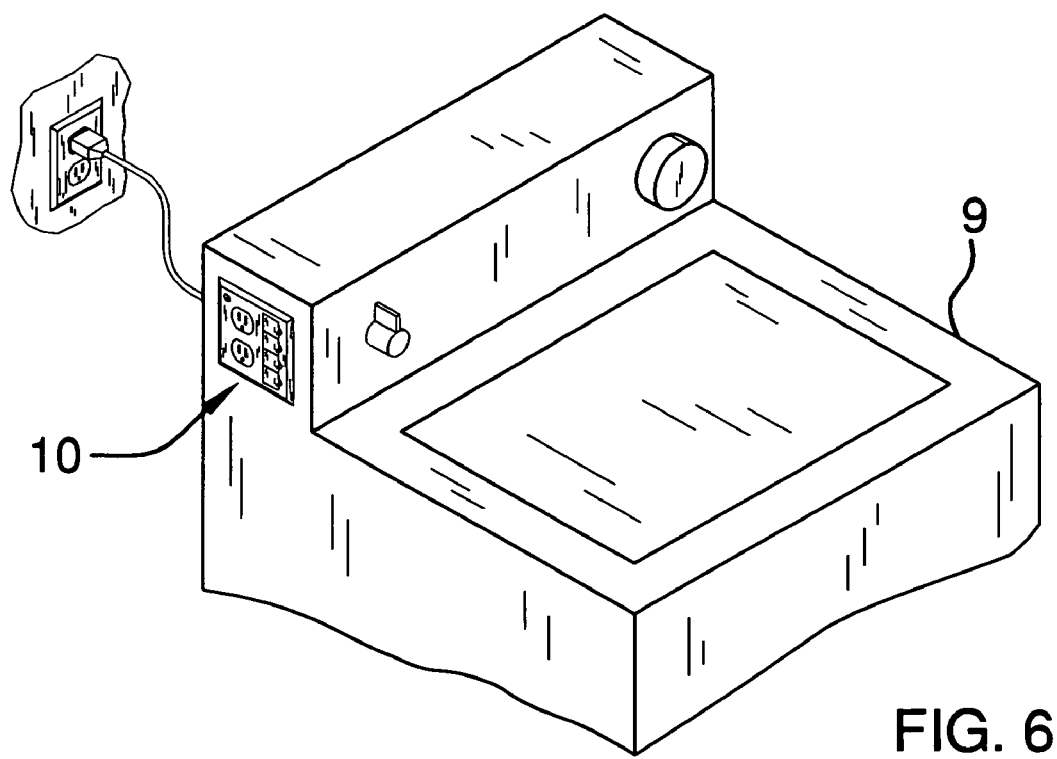
FIG. 6 is a schematic perspective view of a fourth embodiment of the present invention.

As best illustrated in FIGS. 1 through 6, the battery charger and emergency power supply assembly 10 is generally found in two primary embodiments. The first embodiment 10a is depicted in FIGS. 1 and 2 while a second embodiment 10b is shown in FIG. 4. FIGS. 5 and 6 depict variations on uses for either embodiment of the device.

A housing 12 is provided. A switch 14 is positioned in the housing 12 and is electrically coupled to a power supply 5. The housing 12 may either be mounted in within a dwelling wall 6 or may include male electrical prongs 16 electrically coupled to the switch 14. The prongs 16 may be extended into a conventional electrical power outlet 7. If prongs 16 are utilized, the power outlet 7 performs as the power supply to the switch 14. If the prongs 16 are not utilized and the housing 12 is mounted in the wall 6, then the switch 14 is preferably hardwired to the electrical wiring 8 of the dwelling. At least one electrical plug outlet 18 is mounted in a front wall 19 of the housing 12. The plug outlet 18 is electrically coupled to the switch.

A battery charger 20 is mounted within the housing 12. The battery charger 20 is electrically coupled to the power supply 5. The battery charger 20 is a conventional battery charger that converts AC current to DC current and recharges rechargeable batteries. A configuration of the battery charger 20 will vary depending on the type of rechargeable batteries being used.

The first embodiment 10a includes a plurality of charging ports 22. Each of the charging ports 22 extends into the housing 12 and each is electrically coupled to the battery charger 20. A plurality of rechargeable batteries 24 is provided. Each of the rechargeable batteries 24 includes plug members 26 adapted for electrically coupled to the charging ports 22. Preferably each of the rechargeable batteries 24 of the first embodiment 10a includes a LED 28 electrically coupled thereto. The LED 28 is illuminated when the battery 24 is being charged. An inverter 30 is electrically coupled to each of the charging ports 22. The inverter 30 is electrically coupled to the switch 14. The switch 14 may selectively open a circuit between the plug outlet 18 and the power supply 5 or the plug outlet 18 and the inverter 30. The batteries 24 may thus be used for supplying power to an appliance in the event of a power outage. The user may selectively choose the number of batteries 24 to be coupled to the battery charger 20. The switch 14 is preferably an automatic switch that automatically switches from the power supply 5 to the inverter 30 when a power drop is experienced in the power supply 5.

The second embodiment 10b includes a plurality of compartments 32 that are mounted in the housing 12 and extend into the front wall. Each of the compartments 32 is electrically coupled to the battery charger 20. Each of the compartments 32 has a size and shape for selectively receiving a rechargeable battery 34. The rechargeable batteries 34 of the second embodiment 10b are conventional rechargeable batteries and the battery charger 20 and compartments 32 are also conventional with respect to typical charger/battery holding devices. Each of the compartments 32 has electrical contacts 36 therein for transferring an electrical current from the battery charger 20 to the rechargeable battery 34. The compartments 32 will preferably be designed to match conventional battery sizes such as AA, AAA and D. The inverter 30 is electrically coupled to each of the compartments 32 and to the switch 14. As in the first embodiment 10a, the electricity stored within the rechargeable batteries 34 may be drawn upon in the event of a power failure. However, the rechargeable batteries 34 may be removed as needed for small electronics and then replaced in the compartments 32 for recharging. This provides the dual function of battery charger and emergency power supply. LED's 38 may be mounted on the housing 12 and electrically coupled to the switch 14 to indicated when power is being drawn from the batteries 34.

Additional variations are shown in FIGS. 5 and 6. FIG. 5 includes a light 40 which is attached to the housing 12 and replaces the plug outlet 18 of the first 10a and second 20b embodiments. When power is disrupted to the light 40, the switch 14 draws power from the batteries 24, 34 to provide light. FIG. 6 shows the device 10 mounted on an appliance 9. It is preferred that this feature be used with large household appliances such as ovens, washing machines, dryers, refrigerators and the like.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An outlet and battery charger combination device for providing an emergency supply of electricity and for charging a plurality of batteries, said device comprising:

a housing;

a switch being positioned in said housing and electrically coupled to a power supply;

at least one electrical plug outlet being mounted in a front wall of said housing, said plug outlet being electrically coupled to said switch;

a battery charger being mounted within said housing, said battery charger being electrically coupled to the power supply;

a plurality of compartments being mounted in said housing and extending into said front wall, each of said compartments being electrically coupled to said battery charger, each of said compartments having a size and shape for selectively receiving a rechargeable battery, each of said compartments having electrical contacts therein for transferring an electrical current from said battery charger to the rechargeable battery;

a plurality of rechargeable batteries, each of said rechargeable batteries being positioned in one of said compartments;

an inverter being positioned within said housing and electrically coupled to each of said compartments, said inverter being electrically coupled to said switch; and wherein said switch may selectively open a circuit between said plug outlet and said power supply or said plug outlet and said inverter.

2. An outlet and battery charger combination device for providing an emergency supply of electricity and for charging a plurality of batteries, said device comprising:

a housing;

a switch being positioned in said housing and electrically coupled to a power supply;

at least one electrical plug outlet being mounted in a front wall of said housing, said plug outlet being electrically coupled to said switch;

a battery charger being mounted within said housing, said battery charger being electrically coupled to the power supply;

a plurality of charging ports, each of said charging ports extending into said housing and being electrically coupled to said battery charger;

a plurality of rechargeable batteries, each of said rechargeable batteries including plug members electrically coupled to said charging ports;

an inverter being electrically coupled to each of said charging ports, said inverter being electrically coupled to said switch; and wherein said switch may selectively open a circuit between said plug outlet and said power supply or said plug outlet and said inverter.

* * * * *